(12) United States Patent
Knutt et al.

(10) Patent No.: US 10,699,747 B2
(45) Date of Patent: Jun. 30, 2020

(54) SYSTEM AND METHOD FOR RECORDING A VIDEO SCENE WITHIN A PREDETERMINED VIDEO FRAMEWORK

(71) Applicant: YUVIE, LLC, North Miami, FL (US)

(72) Inventors: James Karl Knutt, Miami Shores, FL (US); Joseph Takai, Hermosa Beach, CA (US); Lee Hollingworth, Balgriffin (IE); Thomas Rodelli, Miami Beach, FL (US); Sheila Duffy-Lehrman, Miami Beach, FL (US)

(73) Assignee: YuVie LLC, North Miami, FL (US)

( * ) Notice: Subject to any disclaimer, the term of this patent is extended or adjusted under 35 U.S.C. 154(b) by 0 days.

(21) Appl. No.: 15/640,801

(22) Filed: Jul. 3, 2017

(65) Prior Publication Data

US 2018/0005665 A1 Jan. 4, 2018

Related U.S. Application Data

(60) Provisional application No. 62/357,424, filed on Jul. 1, 2016.

(51) Int. Cl.
*G11B 27/031* (2006.01)
*H04L 29/08* (2006.01)
(Continued)

(52) U.S. Cl.
CPC .......... *G11B 27/031* (2013.01); *G11B 27/036* (2013.01); *G11B 27/34* (2013.01); *G11B 31/006* (2013.01); *H04L 67/36* (2013.01); *H04N 5/77* (2013.01); *H04N 5/91* (2013.01); *G10L 15/22* (2013.01); *G10L 2015/223* (2013.01); *H04L 67/26* (2013.01)

(58) Field of Classification Search
CPC . G10L 2015/223; G10L 15/22; G11B 27/031; G11B 31/006; G11B 27/34; G11B 31/00; H04N 5/77; H04N 5/91; H04L 29/08; H04L 67/36; H04L 67/26
USPC .......................................................... 386/228
See application file for complete search history.

(56) References Cited

U.S. PATENT DOCUMENTS

| | | | |
|---|---|---|---|
| 6,597,375 B1 * | 7/2003 | Yawitz | G11B 27/034 715/723 |
| 2012/0308209 A1 * | 12/2012 | Zaletel | G11B 27/034 386/278 |

(Continued)

*Primary Examiner* — Thai Q Tran
*Assistant Examiner* — Nienru Yang
(74) *Attorney, Agent, or Firm* — The Concept Law Group, PA; Scott D. Smiley; Scott M. Garrett

(57) ABSTRACT

A computer-implemented video method includes receiving a first digital video file and a second digital video file; recognizing the first digital video file as a beginning scene and the second digital video file as an ending scene; receiving a user input to record a middle scene, wherein the beginning scene, the middle scene, and the ending scene being configured to form a full video; and responsive to a user input to record, providing a real-time queue for the recording by sequentially, in real-time: 1) first, playing the beginning scene within a first preview window on the video display; 2) second, recording the middle scene and simultaneously displaying the middle scene within a video capture window on the video display; and 3) third, playing the ending scene within a second preview window on the video display.

20 Claims, 8 Drawing Sheets

(51) Int. Cl.
*H04N 5/77* (2006.01)
*G11B 31/00* (2006.01)
*G11B 27/34* (2006.01)
*G10L 15/22* (2006.01)
*H04N 5/91* (2006.01)
*G11B 27/036* (2006.01)

(56) References Cited

U.S. PATENT DOCUMENTS

2014/0192211 A1* 7/2014 Konicek ................ G03B 17/02
    348/207.1
2016/0365115 A1* 12/2016 Boliek .................. G06F 3/0484

* cited by examiner

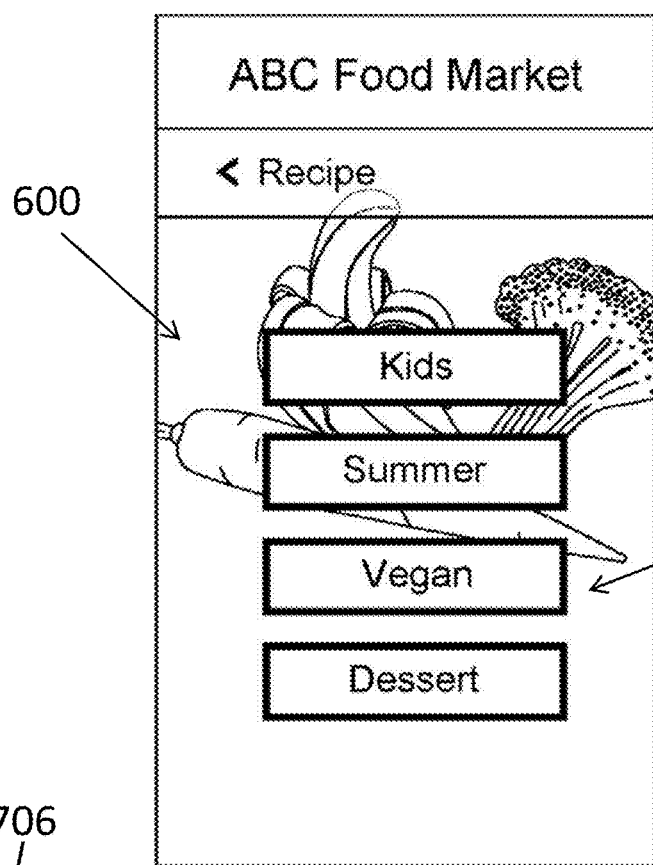
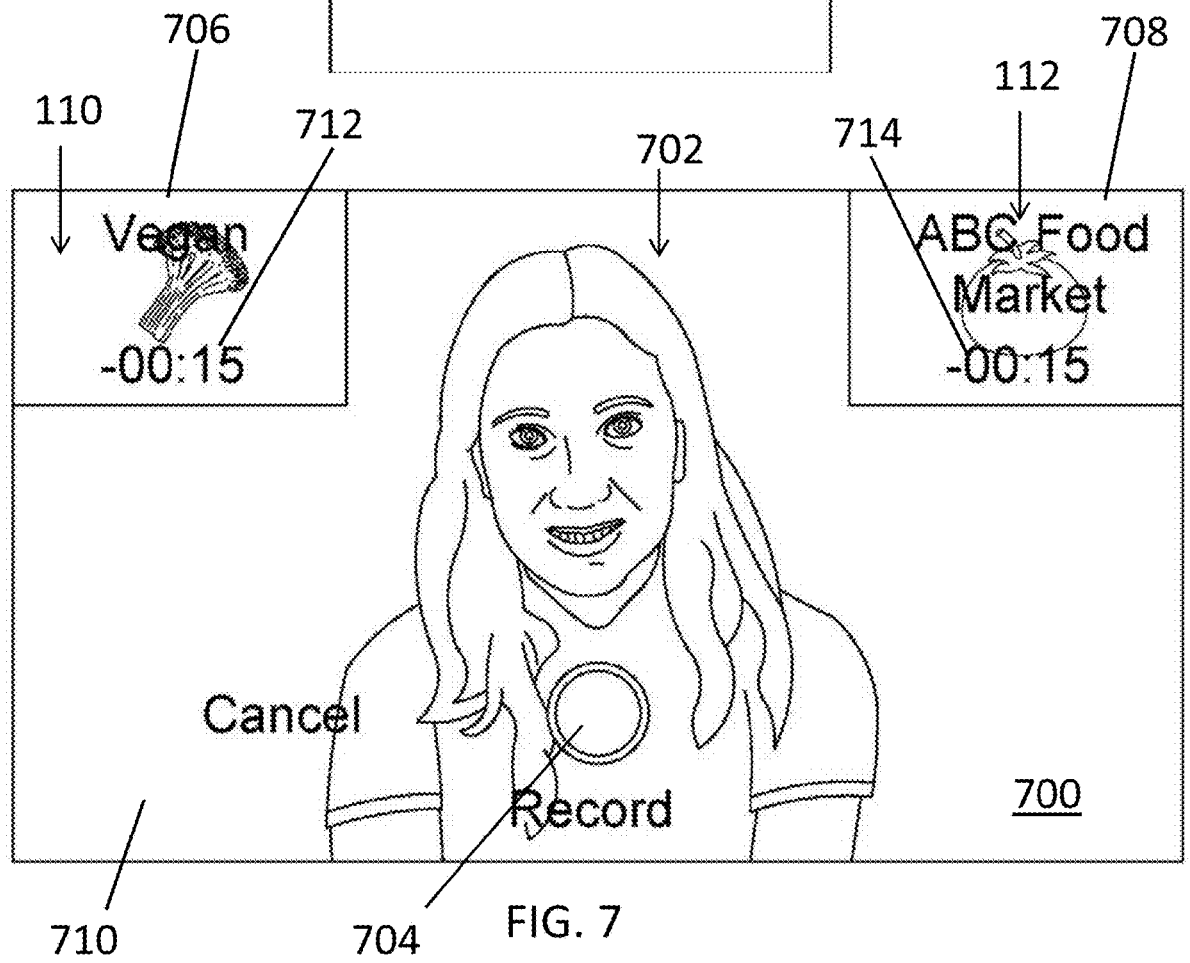

SYSTEM AND METHOD FOR RECORDING A VIDEO SCENE WITHIN A PREDETERMINED VIDEO FRAMEWORK

CROSS-REFERENCE TO RELATED APPLICATION

This application claims priority to U.S. Provisional Patent Application No. 62/357,424 filed Jul. 1, 2016, the entirety of which is incorporated by reference.

FIELD OF THE INVENTION

The present invention relates generally to video recording and editing, and, more particularly, relates to system and method of providing a real-time queue for the recording of a middle scene within a predetermined video framework.

BACKGROUND OF THE INVENTION

The art of video editing has evolved from its early days, in which linear video editing was the standard form of editing, to the current state the art that allows for non-linear video editing. As such, it is well-known for video editing software to allow users to modify a video and/or combine another video with the video. The process may involve collecting the videos on a computing device associated with the video editing software and the operator of the video editing software providing a plurality of user inputs to arrange the video(s) in a desired sequence. For example, the operator may utilize a video editing software to remove frames from the video, adjust sound and picture quality, add transitions between frames, or otherwise arrange the video in a selected format. The video editing software may then output an edited video based on the plurality of user inputs to arrange the video(s) in the desired sequence.

Unfortunately, such video editing software suffers from a number of deficiencies. One such deficiency is that the step of editing a video is typically the second step in a production process, with the first step being the actual recording of one or more video segments. Indeed, video editing software is commonly referred to as "post-production" software, providing for the editing of video segments after the recording and production of the segments. As such, video editing software typically does not allow for a user to make edits to video segments in real-time, instead forcing the user to either re-record a video segment, or fix issues later during the "post-production" editing step of the production process.

Another deficiency in the current state of the art of video editing is that video editing software is typically complicated in nature and, as such, associated with a rather steep learning curve, often requiring users to learn a wide range of editing commands and tools. Accordingly, such video editing software is often associated with video editing professionals, or novice video editors willing to dedicate the time, effort, and other resources to learn the various commands and tools associated with the video editing software.

In an effort to make video editing more accessible to the average consumer, having little-to-no video editing experience, more "user-friendly" video editing software has become available over the past few years. This is due, at least in part, to the increasingly widespread use of, and demands for, videos to convey information to relevant users, such as consumers and clients, in ways that are accessible, interesting, and informative. As such, instead of conveying information in a more static format on websites, by, for example, textual descriptions or still images, users can experience informative videos tailored to unique topics. While more user-friendly video editing software is becoming increasingly available, many consumers and businesses still use third-party video editing professionals for their video needs, because they simply do not have the time or skills to record, edit, and create a finished product in a professional manner. Moreover, even if a business spends the time to create a video of sufficient quality, it is unlikely that the business has the time to create multiple videos in an efficient and professional manner without the use of a third-party professional.

Accordingly, under the current state of the art, the creation of one or more finished videos of professional quality involves separate and independent steps, which must be replicated for each additional video that is created. Since such production processes involve multiple steps for each video segment, a user, whether a professional or novice, typically spends a great deal of time recording, re-recording, and editing each video segment. Moreover, since the user must record videos separately, even if the videos are related and share subject matter, the production process is inefficient and can become extremely expensive, especially when engaging the services of a third-party professional.

Therefore, a need exists to overcome the problems with the prior art as discussed above, namely to provide a video editing software that allows for real-time editing of video segments, and that allows for the replication of portions of a video to allow a user to re-use the portions of the video in later-recorded video segments.

SUMMARY OF THE INVENTION

The invention provides a system and method for recording a video scene within a predetermined video framework that overcomes the hereinafore-mentioned disadvantages of the heretofore-known devices and methods of this general type.

In view of the foregoing and other objects in view, there is provided, in accordance with the invention, a method including steps of receiving, by a processor communicatively coupled to a video display and a front-facing camera, a first digital video file and a second digital video file; recognizing, by the processor, the first digital video file as a beginning scene and the second digital video file as an ending scene; and after receiving the first digital video file and the second digital video file, receiving, by the processor, a user input to record a middle scene, wherein the beginning scene, the middle scene, and the ending scene are configured to form a full video. The method may further include steps of, responsive to the user input to record, the processor: first, playing the beginning scene within at least one preview window on the video display; second, automatically after an end of the beginning scene, recording the middle scene via the front-facing camera while simultaneously displaying the middle scene within a video capture window on the video display; and third, automatically after recording an end of the middle scene, playing the ending scene within the preview window on the video display.

In accordance with another feature of the present invention, the front-facing camera has a lens facing a user on a same side as the video display.

In accordance with yet another feature of the present invention, the step of playing the beginning scene further includes displaying a timer within at least one of the preview window and the video capture window, the timer configured to indicate a start time of the automatic recording of the middle scene.

In accordance with another feature, an embodiment of the present invention further includes identifying, by the processor, the end of the beginning scene and a start of the ending scene; and wherein the step of recording the middle scene further includes automatically stopping, by the processor, recording the middle scene immediately before playing the start of the ending scene.

In accordance with another feature of the present invention, the full video starts at the start of the beginning scene and ends at the end of the ending scene.

In accordance with another feature of the present invention, the beginning scene and the ending scene are user-customized scenes created by a remote third-party video provider and transmitted by the remote third-party video provider to the processor over a network; and the processor is housed within a personal mobile device of a user for self-recording the middle scene between a preview of the beginning scene and a preview of the ending scene.

In accordance with another feature of the present invention, at least one of the beginning scene and the ending scene are formed as one of a freeze frame and a moving sequence of frames.

In accordance with another feature, an embodiment of the present invention further includes identifying, by the processor, a predetermined duration for recording the middle scene; and wherein the automatic recording of the middle scene is performed by the processor for the predetermined duration.

In accordance with another feature, an embodiment of the present invention includes a microphone and the processor is operably configured to execute instructions for: receiving, via a user input interface, at least one word from the user; associating the word with a record stop indication; and during the recording of the middle scene: recognizing a human utterance received via the microphone; analyzing the human utterance to identify at least one human language word; comparing the human language word identified from the human utterance to the word associated with the record stop indication; and in response to determining that the human language word matches the word associated with the record stop indication, stopping the recording of the middle scene and automatically playing the ending scene.

In accordance with another feature, an embodiment of the present invention further includes receiving, by the processor, a user input to publish the full video; and responsive to receiving the user input, automatically publishing, by the processor, the full video on the Internet.

In accordance with another feature, an embodiment of the present invention further includes receiving, by a processor communicatively coupled to a video display and a video camera, at least one digital video file; recognizing, by the processor, the digital video file as a beginning scene and an ending scene; after receiving the digital video file, receiving, by the processor, a user input to record a middle scene, wherein the beginning scene, the middle scene, and the ending scene being configured to form a full video. The method may further include steps of, responsive to a user input to record, providing a real-time queue for the recording by sequentially, in real-time: 1) first, playing the beginning scene within a first preview window on the video display; 2) second, recording the middle scene via the video camera and simultaneously displaying the middle scene within a video capture window on the video display; and 3) third, playing the ending scene within a second preview window on the video display.

In accordance with another feature of the present invention, during the real-time queue, the video capture window, the first preview window, and the second preview window are simultaneously visible on the video display.

In accordance with yet another feature of the present invention, the processor is communicatively coupled to a front-facing camera, the front-facing camera having a lens facing a user on a same side as the video display; and the recording of the middle scene is by the front-facing camera.

In accordance with yet another feature of the present invention, the beginning scene and the ending scene are user-customized scenes created by a remote third-party video provider and transmitted by the remote third-party video provider to the processor over a network; and the processor is housed within a personal mobile device of a user for self-recording the middle scene and self-creating the full video.

In accordance with another feature of the present invention, the beginning scene and the ending scene are stored in a non-transitory memory accessible by the processor, the processor being operably configured to execute instructions for: accessing the beginning scene and the ending scene at a plurality of instances to create a corresponding plurality of full videos, each of the plurality of full videos having the same beginning and ending scene, but with a different recording of the middle scene.

In accordance with yet a further feature of the present invention, determining a length of time for the user-recorded video clip; and wherein the identifying step further includes identifying the beginning point and the ending point within the video length for the overlay of the user-recorded video clip based on the length of time.

In accordance with another feature of the present invention, the step of determining the length of time for the user-recorded video clip is performed prior to recording the user-recorded video clip by the third-party video provider.

In accordance with yet another feature of the present invention, the step of determining the length of time for the user-recorded video clip is performed prior to recording the user-recorded video clip by a user.

Although the invention is illustrated and described herein as embodied in a system and method for recording a video scene within a predetermined video framework, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the computing device. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 6 is a screenshot of the exemplary software application of FIG. 1, depicting the user being presented with a menu of video sub-categories under a general video category of "recipes" in accordance with an exemplary embodiment of the present invention;

FIG. 7 is a screenshot of the exemplary software application of FIG. 1, depicting the a record screen for the user having a video capture sub-window between preview windows of predetermined beginning and ending scenes, in accordance with the present invention;

DETAILED DESCRIPTION

Figure 1:
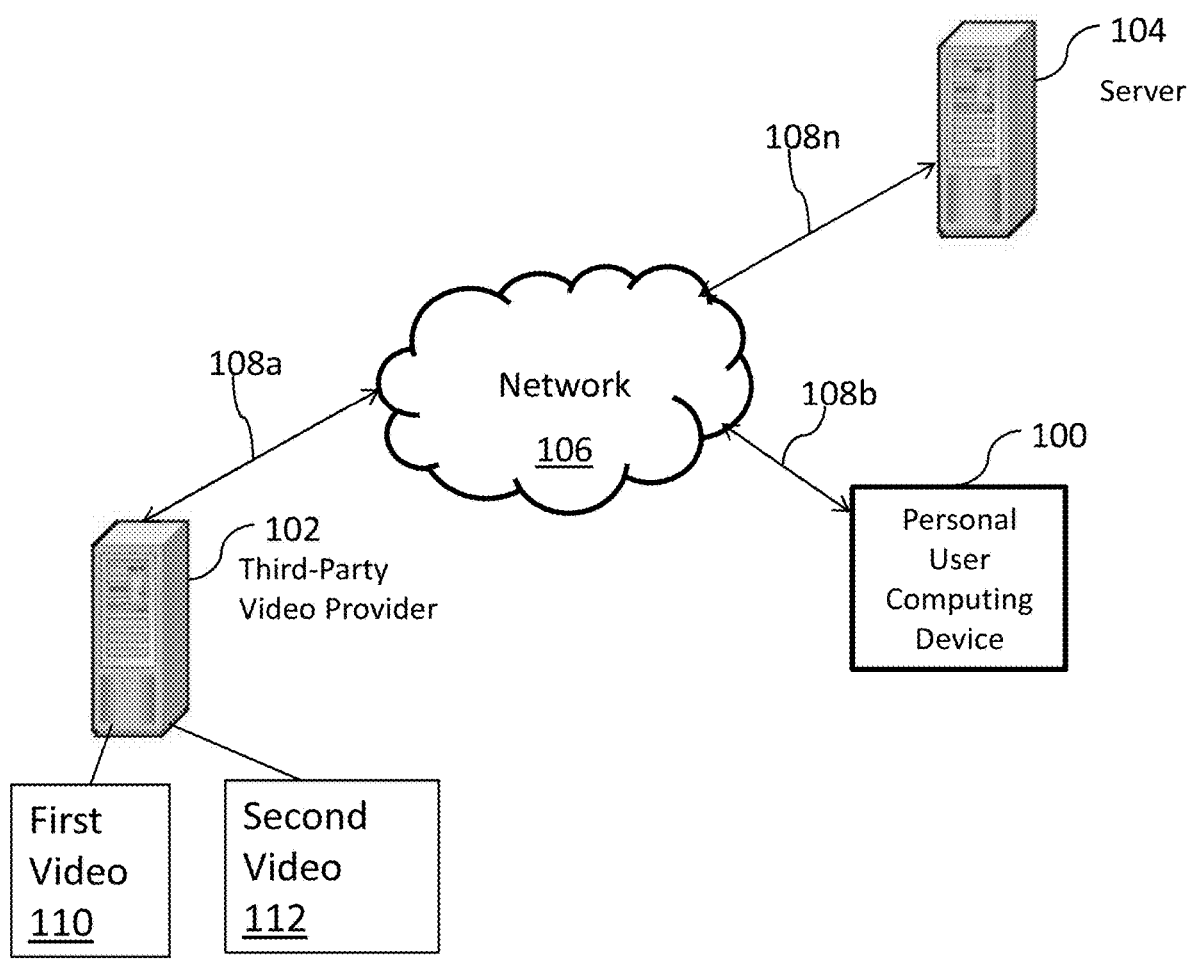
FIG. 1 is a block diagram of an exemplary distributed data processing network with a third-party video provider and a personal user computing device in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

In order to provide a concise description of the embodiments, not all features of every implementation are described. It is appreciated that in the development of any such implementation, as in any engineering or design project, various implementation-specific decisions are required to be made to achieve, for example, specific system-related goals, which may, of course, vary from one implementation to another. Thus, it is understood by those of skill in the art that such a development and implementation effort, while possibly being complex and/or time-consuming, is, nevertheless, an undertaking of electronic hardware, software, and network design and development by those of skill in the art having the benefit of the present disclosure.

The present disclosure describes a novel and efficient system and method for recording video content within a predetermined video framework. Embodiments of the invention provide a real-time queue for the recording, including, in sequential order and in response to a user input to record: playing a beginning scene within a preview window, automatically recording a middle scene while simultaneously displaying the middle scene within a video capture window, and playing an ending scene within a preview window. In addition, embodiments of the invention provide for receiving a first and a second predetermined digital video file prepared by a remote third-party video provider and recognizing each as a beginning scene and an ending scene. Advantageously, the user can continuously record new video content on a rather frequent basis between a re-usable, predetermined video framework.

Referring to FIGS. 1-11, embodiments of the present invention are shown in a block diagram of an exemplary network environment, a block diagram of an exemplary computing device, a process flow chart corresponding to an exemplary process, and a plurality screenshots of an exemplary software application. FIGS. 1-11 show several advantageous features of the present invention, but, as will be described below, the invention can be provided in several shapes, sizes, combinations of features and components, and varying numbers and functions of the components.

Network

The first example of a network architecture environment, as shown in FIG. 1, includes a computing device 100, a video provider 102, and a website server 104 communicatively coupled over a network 106 (e.g., the Internet and/or a cellular network). The network 106 may include connections 108*a-n*, which are the medium used to provide communications links between various devices and computers connected together within the network 106. The connections 108*a-n* may be wired (e.g., cable, phone line, fiber optic, etc.) or wireless connections (e.g., radio frequency, infrared radiation transmissions, etc.). Many other wired and wireless connections are known in the art and can be used with the present invention. The network 106 may include the Internet, one or more cellular networks, a peer-to-peer network, an intranet, and/or the like. As is known in the art, many other types of networks are available and may be used with embodiments of the present invention.

The computing device 100 may be a personal computing device associated with a user, such as, for example, a smartphone, a computer tablet, a personal computer (PC), and the like. The computing device 100 may be considered an electronic device used by the user to record real-world video content within the predetermined video framework, in accordance with embodiments of the present invention. Accordingly, the computing device 100 should have, or be communicatively coupled to, a video camera and a video display. An exemplary embodiment of the computing device 100 will be described in more detail herein with reference to FIG. 2.

The video provider 102 may be a third-party video provider, such as, for example, a server or a PC associated with a professional video editor or videographer. In other words, the video provider 102 may be a third-party (as to the user) video provider operating a server or a PC used to professionally create and edit videos. Stated yet another way, the video provider 102 may be associated with a video editing station that is operably configured to provide only beginning scenes 110 and corresponding ending scenes 112, without any middle scenes, in accordance with the present invention. The term "only" is used herein to contrast traditional video editing companies hired to create and produce whole videos, rather than merely beginning and ending scenes. In one non-limiting example, the third-party video provider 102 may be an advertising or marketing company. In another non-limiting example, the third-party video provider 102 may be a broadcast cable or television network provider. Other types of known video providers may be used with the present invention.

In some embodiments, the video provider 102 may not be a third-party, but may be a PC or other computing device associated with the user. For example, the user may provide the video framework at the computing device 100 or another computing device associated with the user. Importantly, the video provider 102 provides the video framework (with an intentional gap in-between), within which the user can record and re-record independent content in accordance with the present invention. Specifically, the video framework includes the beginning scene 110 and the corresponding ending scene 112. Such methods of independently recording user content within the predetermined video framework provided by third-party video providers 102 will be described herein in more detail below, with reference to the flow chart depicted in FIG. 3 and the screenshots depicted in FIGS. 4-11.

The server 104 may be a database or a website server at which the user may upload his/her completed/full video for publication on the network 106, such as the Internet. Software applications used to implement at least one or more aspects of the present invention may allow the user to automatically publish the full video product for others to view. In one non-limiting example, the server 104 may be a social network (e.g., Youtube) on which the full video can be published by the user. In another non-limiting example, the server 104 may be a website server for a website owned by the user and on which the user may publish his/her full video immediately after recording the user's content. Other types of known servers, computers, or databases may be used with the present invention to facilitate sharing of the user content with others on the network 106. As is known in the art, other electronic devices may be also connected to the network 106 that are not shown in FIG. 1.

Hardware

Figure 2:
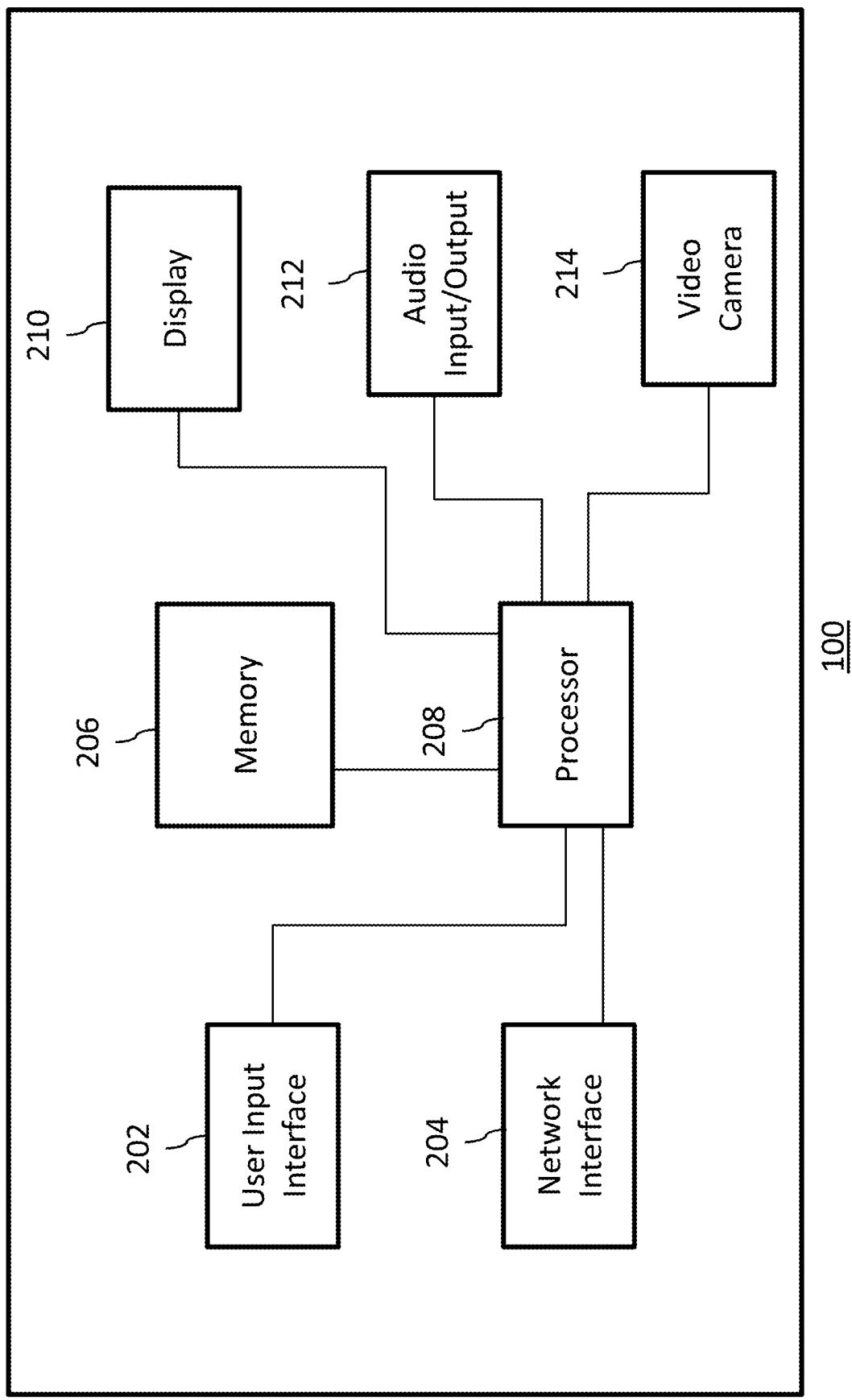
FIG. 2 is a block diagram of a computing device that may be implemented as a network device, such as the personal user computing device and/or the third-party video providing computing device, in accordance with an embodiment of the present invention.

Referring now primarily to FIG. 2, an exemplary electronic device is illustrated in a block diagram. The electronic device may be the personal computing device 100 associated with the user. The PC or server associated with the third-party video provider 102, being itself a computing device, may also be similarly or identically constructed and therefore will not be separately described herein. For the sake of clarity, it is intended that the term "video provider 102," as used herein, is also intended to indicate a PC, server, or other computing device associated with the video provider 102.

The exemplary computing device 100 may include a user input interface 202, a network interface 204, memory 206, a processing device 208, a display 210, an audio input/output 212, and a video camera 214.

The video camera 214 may include two video cameras, a front-facing video camera and a rear-facing video camera. As is known in the art, a front-facing video camera is a camera having a lens facing a user on the same side as the display 210. The rear-facing video camera is a camera having a lens facing in a direction opposite to the front-facing camera to record on the other side of the display 210. Some embodiments of the computing device 100 may include only a front-facing video camera or only a rear-facing camera, or may include more than two video cameras. In a preferred embodiment, the computing device 100 includes at least a front-facing video camera so that the user may self-record user content, while also being able to view a playback of the video framework before and after the user independently records content. Such playback provides a real-time queue for the user to record his/her own independent content within the predetermined video framework, as will be described in more detail herein below. The video camera 214 is preferably a high-quality video camera able to produce high-quality video images.

The user input interface 202 functions to provide a user a method of providing input to the computing device 100. The user input interface 202 may also facilitate interaction between the user and the device 100. The user input interface 202 may be a keypad providing a variety of user input operations. For example, the keypad may include alphanumeric keys for allowing entry of alphanumeric information (e.g. telephone numbers, contact information, text, etc.). The user input interface 202 may include special function keys (e.g. a camera shutter button, volume control buttons, back buttons, home button, etc.), navigation and select keys, a pointing device, and the like. Keys, buttons, and/or keypads may be implemented as a touchscreen associated with the display 210. The touchscreen may also provide output or feedback to the user, such as haptic feedback or orientation adjustments of the keypad according to sensor signals received by motion detectors, such as an accelerometer, located within the device 100. The user input interface 202 may allow a user to input commands to record video content in accordance with the present invention. The user input interface 202 may also allow a user to input commands to publish the full video (including the newly recorded content wrapped in the predetermined framework), and/or select other inputs to implement yet other aspects of the inventive system and method.

The network interfaces 204 may include one or more network interface cards (NIC) or a network controller. In some embodiments, the network interface 204 may include a personal area network (PAN) interface. The PAN interface may provide the capability for the computing device 100 to network using a short-range communication protocol, for example, a Bluetooth communication protocol. The PAN interface may permit one computing device 100 to connect wirelessly to another computing device 100 via a peer-to-peer connection.

The network interfaces 204 may also include a local area network (LAN) interface. The LAN interface may be, for example, an interface to a wireless LAN, such as a Wi-Fi network. In one embodiment, there is a wireless LAN that provides the computing device 100 with access to the Internet for receiving the beginning scene 110 and the ending scene 112 (i.e., the predetermined video framework) from the video provider 102 and uploading a full video file (with the recorded content wrapped in the predetermined video framework) to the server 104, over the Internet. The range of the LAN interface may generally exceed the range available via the PAN interface. Typically, a connection between two electronic devices via the LAN interface may involve communication through a network router or other intermediary device.

Additionally, the network interfaces 204 may include the capability to connect to a wide area network (WAN) via a WAN interface. The WAN interface may permit a connection to a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

Memory 206 associated with the device 100 may be, for example, one or more buffer, a flash memory, or non-volatile memory, such as random access memory (RAM). The computing device 100 may also include non-volatile storage. The non-volatile storage may represent any suitable storage medium, such as a hard disk drive or non-volatile memory, such as flash memory. The memory 206 may be used to store the beginning scene 110 and the ending scene 112, as well as, the user content recorded at the computing device 100. The memory 206 may also be used to store the full video including the user recorded video content wrapped in the predetermined video framework. Software applications and associated computer instructions may automatically delete the full video from the memory 206 after the full video is uploaded to the server 104 for publication. Because a preferred embodiment of the present invention includes the computing device 100 as a mobile smartphone, memory 206 conservation is important because high-quality video files will require a significant amount of the memory 206, which is limited particularly in mobile devices. Memory 206 may also store the software application associated with the present invention, which, due to the streamlined and efficient manner in which such software application creates full video products, is able to occupy much less memory than most comprehensive video editing software. Conventionally, video editing software that is able to combine and arrange multiple video scenes into a single video file is particularly large such that use on a PC, rather than a mobile device 100, is required. In contrast, embodiments of the present invention provide a streamlined, efficient recording system and process that efficiently utilizes memory 206 of the computing device 100 to record user content in a very specific and efficient manner that improves the functioning of the computing device 100 as a video recording and video editing instrument. In other words, embodiments of the present invention allows the user to effectively and efficiently record, create, and edit video files on a mobile computing device 100, in a novel and inventive manner, without requiring a large video editing software application, or without requiring use of a professional videographer each time the user wants to record new content.

The processing device 208 can be, for example, a central processing unit (CPU), a microcontroller, or a microprocessing device, including a "general purpose" microprocessing device or a special purpose microprocessing device. The processing device 208 executes code stored in memory 206 in order to carry out operation/instructions of the computing device 100. The processing device 208 may provide the processing capability to execute an operating system, run various applications, such as the software application associated with the present invention, and provide processing for one or more of the techniques and process steps described herein.

The display 210 displays information to the user such as an operating state, time, telephone numbers, various menus, application icons, pull-down menus, and the like. The display 210 may be used to present various images, text, graphics, or videos to the user, such as photographs, mobile television content, Internet webpages, and mobile application interfaces. The display 210 may be any type of suitable display, such as an liquid-crystal display (LCD), a plasma display, a light-emitting diode (LED) display, or the like. The display 210 may display a user interface of the software application that allows the user to record user content within a predetermined video framework, in accordance with embodiments of the present invention. Importantly, the display 210 should be a video display operably configured to play video files and otherwise display video content for the user to view thereon. The display 210 may be operably configured to provide a preview window for the user to preview video files associated with the beginning scene 110 and the ending scene 112 in accordance with the present invention. The display 210 may also be operably configured to provide a video capture window for the user to view the scene being recorded by the camera 214 while it's recording in accordance with the present invention.

The computing device 100 may include audio input and output structures 212, such as a microphone for receiving audio signals from a user and/or a speaker for outputting audio data, such as audio alerts, songs, ringtones, video tracks, voice data received by the computing device 100 over a cellular network, and the like. The computing device 100 may also include an audio port for connection to peripheral audio input and output structures, such as a headset, or peripheral speakers or microphones. The microphone may be used in certain embodiments of the present invention to receive human utterances from the user. Such human utterances may be interpreted by the processor 208 (executing instructions associated with the software application) as human language word(s) to identify a record stop word/indication that is operable to automatically stop the user recording and start the preview of the ending scene 112. Such embodiments of the present invention will be described in more detail herein below.

Exemplary Process

Figure 3:
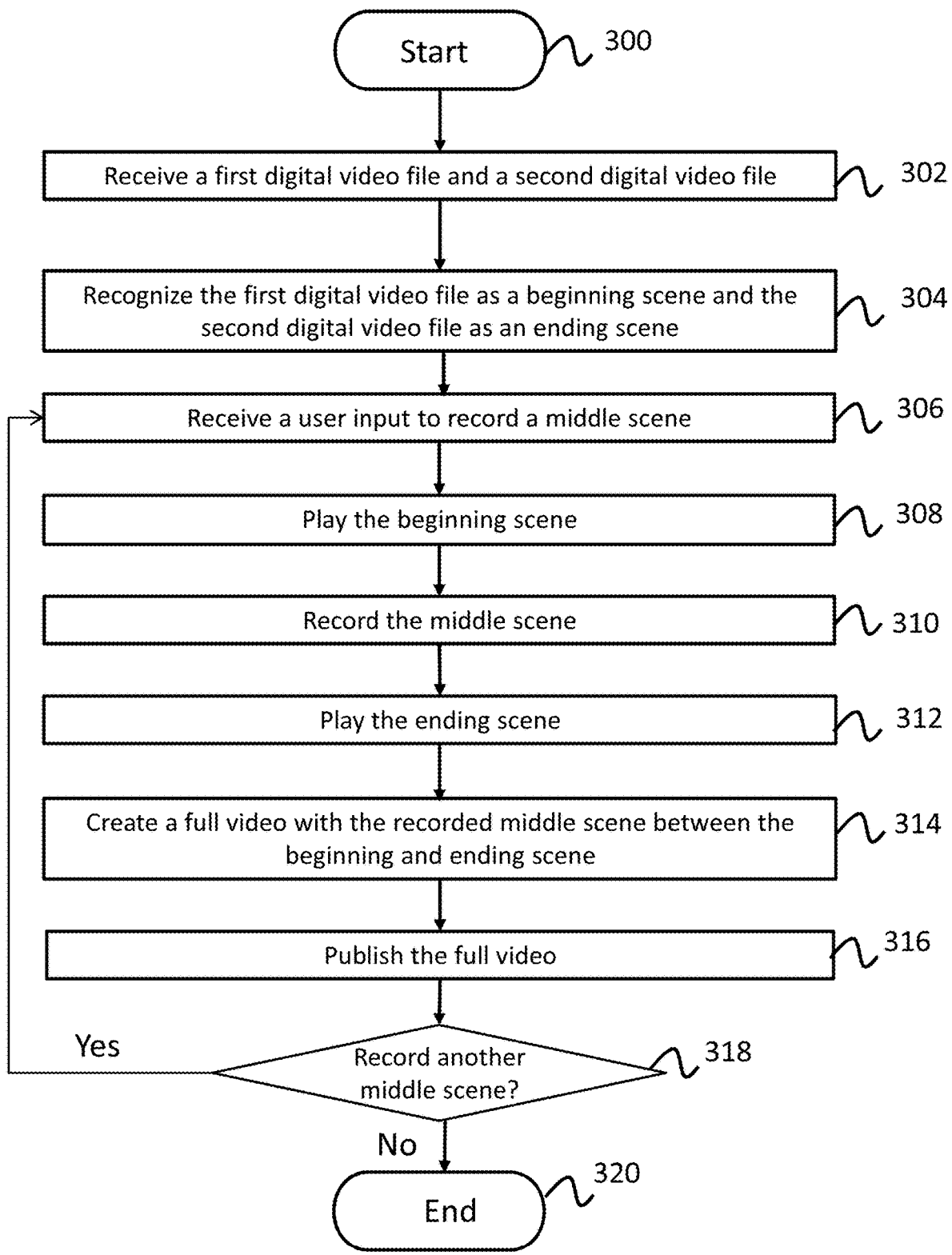
FIG. 3 is a process flow chart representing an exemplary method of recording a video scene within a predetermined video framework in accordance with an embodiment of the present invention.

Having described embodiments of the network environment and the hardware that may be used with the present invention, an example of the novel and inventive method of recording user content within a predetermined video framework will now be described with reference to the process flow chart of FIG. 3, as well as, the screenshots depicted in FIGS. 4-11 and the network devices depicted in FIGS. 1-2. Although FIG. 3 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 3 for the sake of brevity.

Figure 4:
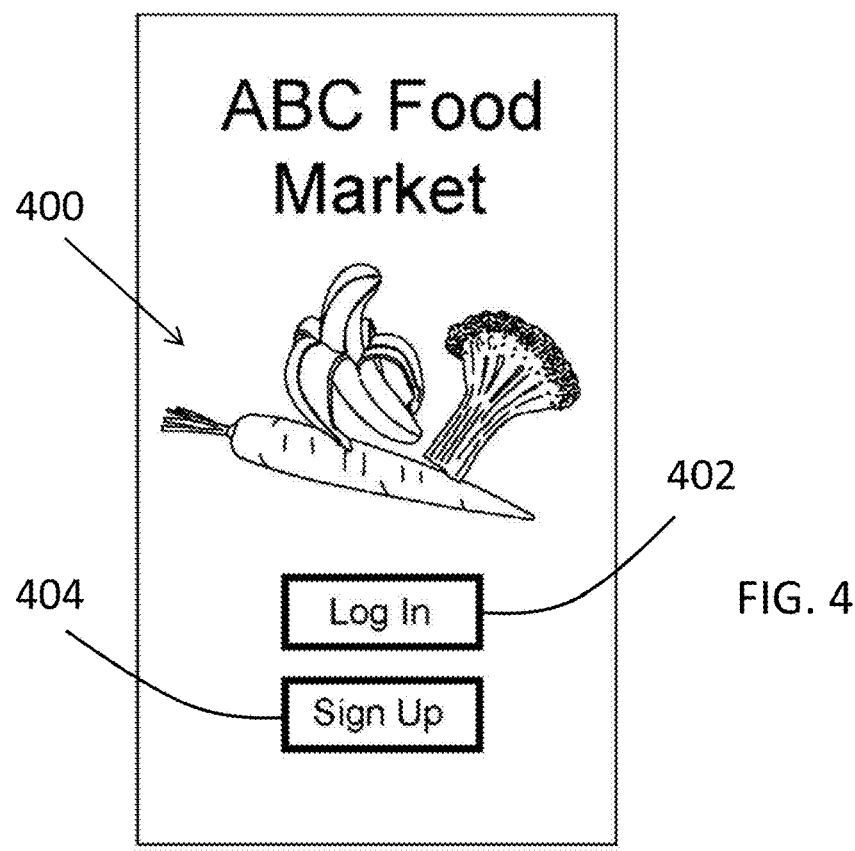
FIG. 4 is a screenshot of an exemplary software application at least partially implementing the invention process, the screenshot depicting a login screen on a user's personal mobile computing device in accordance with an embodiment of the present invention.

Receiving and Recognizing a First Video File and a Second Video File as a Beginning Scene and an Ending Scene An exemplary process of the present invention may begin at step 300 and may immediately proceed to step 302, where a first video file and a second video file is received by the computing device 100, from the third-party video provider 102, over the network 106. In one embodiment, a user may be required to login to his instance of the software application running on his computing device 100. As shown in FIG. 4, a login screen 400 may display a login button 402 to reveal user-input fields for inputting the username and/or password information associated with the user's account. Alternatively, if the user has not yet created an account, the user may first click on the "sign up" button 404 to create his account and interact with his account by, for example, providing various inputs such contact information and other information to be associated with the account.

For the sake brevity, commonly known terms such as, for example, button, icon, menu, page, fields, and the like, will be used herein to describe the novel and inventive process; however, it should be understood that various known web and application elements and other selection/input features may be used to implement the video recording and creation process in other embodiments of the present invention.

In the exemplary embodiment, the instance of the software application is associated with a food market business entitled "ABC Food Market." It should be understood that other instances of the software application may be associated with other types of businesses (e.g., furniture store, law firm, television broadcast network provider), or, in some embodiments, the software application may be more broadly associated with the provider of the application (e.g., Yuvie) with each user account associated with a different business or individual.

Figure 5:
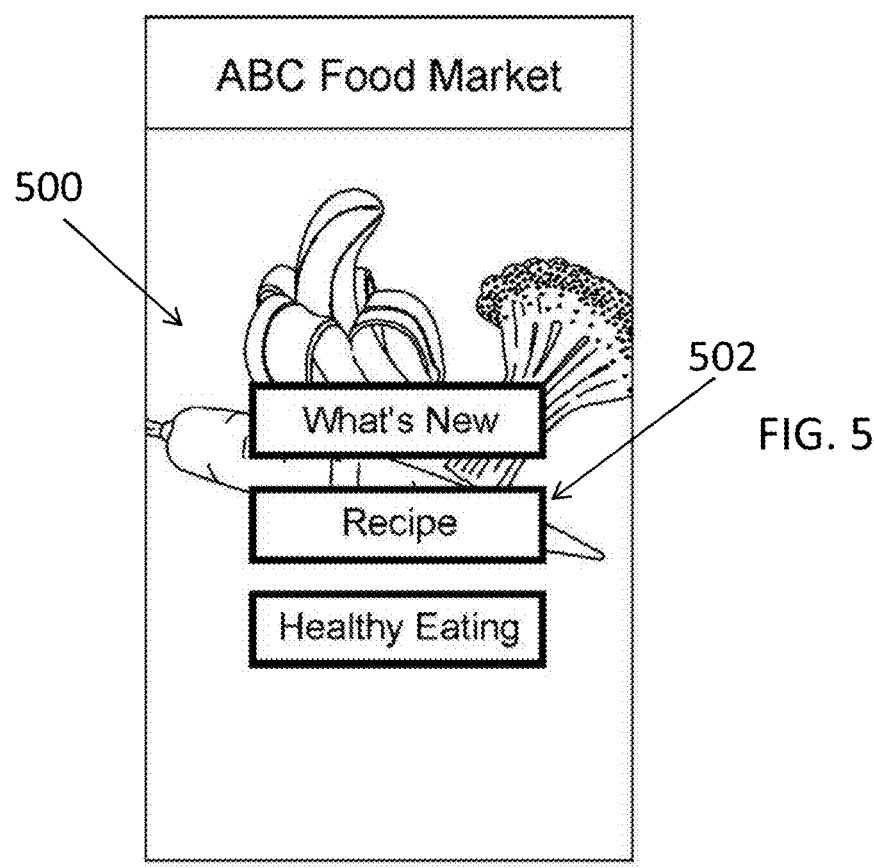
FIG. 5 is a screenshot of the exemplary software application of FIG. 1, depicting a home screen in accordance with an embodiment of the present invention.

Once logged into his user account, the user may be directed to a main or home page in which the user may interact with the software application, the video display 210, and video camera 214 to implement embodiments of the present invention. FIG. 5 is a screenshot of an exemplary home page 500. The home page 500 may include one or more categories of types of user content to be recorded by the user at the computing device 100. The one or more categories may correspond to categories related to the user's business, as shown in FIG. 5. The user may select one of the categories that he desires to create new video content for by, for example, selecting one of the category buttons 502 on the home page 500. Selecting one of the category buttons 502 (e.g., recipe) may cause a sub-menu 600 to appear under the selected category, as depicted in FIG. 6. In the exemplary embodiment, the sub-menu 600 may further include sub-categories, such as, for example, kids' recipes, summer recipes, vegan recipes, and dessert recipes. Sub-category buttons 602 may be provided for the user to select which particular sub-category the user desires to create new content for. Selecting one of the sub-category buttons 602 may cause a novel and inventive record screen 700 to appear on the video display 210, as depicted in FIG. 7. Within the record screen 700 an indication of the beginning scene 110 and an indication of the ending scene 112 may be displayed for the user. In an alternative embodiment, an indication of the beginning scene 110 and an indication of the ending scene 112 may be displayed for the user within a screen prior to the record screen 700 so that the user may, for example, preview the beginning and ending scenes 110 and 112 prior to being prompted to record. The indication may be a still image within the beginning scene 110 and a still image within the ending scene 112, as shown in FIG. 7. As should be understood those of skill in the art, the term "beginning scene" is intended to indicate a video file, preferably a digital video file, of the beginning scene. Likewise, the term "ending scene" is intended to indicate a video file, preferably a digital video file, of the ending scene. Accordingly, the term "video file" may also be used herein to indicate the beginning scene 110 and the ending scene 112.

Any known video file format (e.g., MPEG) may be used with the present invention. In addition, the beginning scene 110 and the ending scene 112 may include a freeze frame (e.g., a freeze frame of the business name and logo on a background) and/or may include a moving sequence of frames. In some embodiments, all or a portion of the beginning scene 110 and/or the ending scene 112 may depict a moving sequence in the real-world, and/or may include a virtual animation. Other known types of video editing features may be included in the scenes 110, 112 (e.g., transition effects, cartoon characters, graphics, etc.). The video files 110 and 112 may also include audio signals corresponding to the visual aspect of the video.

In step 302 of the process, the computing device 100 may receive the beginning scene 110 and the ending scene 112. In one embodiment, a provider of the software application associated with the present invention may independently upload beginning and ending scenes 110 and 112 for each category and sub-category that the user desires video frameworks for. This may be a part of an initial account set-up process. In another embodiment, the software application may include a video frameworks management screen (not shown) where the user can provide user inputs to request and/or receive a beginning scene 110 and an ending scene 112 corresponding to a user-requested category or sub-category. In yet a further embodiment, a video frameworks management screen may automatically populate to show indications of all video frameworks completed and transmitted by the video provider 102 so that the user can view all video frameworks and verify receipt of the same. In some embodiments, portions of the pre-ordering process of video frameworks by the user to the video provider 102 may occur outside of the software application. To elaborate, feedback from the user specifying the desired framework content and design for a particular category may, at least in part, be provided on a more customized basis, such as, for example, phone calls and discussions with the video provider. Advantageously, after such customized video frameworks are created, embodiments of the present invention allow the user to continue to record new content, on-the-fly, within such video frameworks, without the user having to contact the video provider 102. In yet other embodiments, the beginning and ending scenes 110 and 112 may be pre-existing video scenes that are immediately available to the user from the video provider 102, via the software application.

In step 304, the first video file 110 and the second video file 112 are recognized by the processor 208 (executing instructions in accordance with the present invention) as a beginning scene 110 and an ending scene 112. For example, in one embodiment, application programming interfaces ("APIs") may be used to facilitate communications between the video provider 102 and the software application running on the computing device 100. Such APIs may be used to transmit beginning and ending scenes 110 and 112 to the computing device 100 such that the computing device 100 is operable to recognize the files as beginning and ending scenes 110, 112. APIs are known by those of skill in the art and therefore will not be described in great detail herein. Yet other network communications techniques and protocols may be used to communicate the digital files 110 and 112 to the computing device 100 such that they are recognizable by the processor 108 as beginning and ending scenes for use with embodiments of the present invention.

Record a Middle Scene Between Previews of the Beginning Scene and the Ending Scene In step 306, preferably after receiving the first video file 110 and the second video file 112, a user input may be received to record a middle scene 702, as shown in FIG. 7. FIG. 7 may be considered to depict an inventive video record screen 700 on the computer display 210 that facilitates the real-time queue for the user to actually record content. As used here, the term "middle" is intended broadly to indicate that the middle scene 702 is between the beginning scene 110 and the ending scene 112. The term "middle" is not intended to require equidistance from the ends an object.

The video record screen 700 may include a record button 704, a first preview window 706, a second preview window 708, and a video capture window 710. The record button 704 may be configured to allow the user to provide a user input to begin the recording process, by, for example, pressing the record button 704, or otherwise initiating the record. The first preview window 706 may be considered a window (or sub-window), viewable on the computer display 210, to play the beginning scene 110 for the user. The second preview window 708 may be a window (or sub-window), viewable on the computer display 210, to play the ending scene 112 for the user. The video capture window 710 may be considered a window (or sub-window), viewable on the computer display 210, for the user to view a scene through a lens associated with the video camera 214. In other words, the video capture window 710 allows the user to view on the display 210 what the video camera 214 is capturing in real-time (or what the video camera 214 would be capturing if it was actually recording).

The video camera 214 is preferably a self-facing video camera so that the user can simultaneously preview the beginning scene 110 (as it is playing in real-time within the preview window 706) in order to prepare for the actual recording. In other words, the real-time preview of the beginning scene 110 queues up the user for the actual recording. The view capture window 710 allows the user to view himself or herself while he/she is preparing to record, and while he/she is actually self-recording the middle scene 702 after the end of the beginning scene 110.

In one embodiment, the real-time queue for the user includes, in sequential order and in response to the user input to record (corresponding to step 306): first, playing the beginning scene 110 within the first preview window 706 (in step 308); second, automatically after the end of the beginning scene 110 recording the middle scene 702 while simultaneously displaying the middle scene 702 within the video capture window 710 (in step 310); and third, automatically after recording the end of the middle scene 702 playing the ending scene 112 within the second preview window 708 (in step 312). Steps 308, 310, and 312 are preferably performed in sequential order immediately after the previous step. Some non-preferred embodiments may include nominal time gaps between the previews of the predetermined scenes 110, 112 and the recording, but should still be substantially continuous occurring close in time one after the other. Further, the playback of the beginning scene 110 and the ending scene 112 may be in real-time. In other words, the scenes 110 and 112 may be played for the user in real-time (as opposed to a sped up or slowed-down version of the video playback). In further embodiments, the playback of the scenes 110, 112 may also include a real-time playback of the audio associated with the videos 110, 112. In one embodiment, the audio may be automatically played at a low volume so as not to distract the user from focusing on his/her preparations, but still be at a volume setting that is audible for the user to hear.

In a preferred embodiment, the record button 704, the preview windows 706 and 708, and the video capture window 710 are simultaneously visible on the computer display 210, as depicted in FIG. 7, so as to provide the real-time queue for the recording, as described above. In alternative embodiments, the preview windows 706 and 708 and the video capture window 710 are not simultaneously visible on the computer display 210, but may be independently viewable on the display 210, one right after the other in accordance with the sequential order of the real-time queue as described above. It is preferable to at least provide the first preview window 706 playing the beginning scene 110 and the video capture window 708 as simultaneously viewable so that the user can view himself/herself prior to the automatic recording of the middle scene 702 (while the beginning scene 110 is playing). Such feature allows the user the opportunity to prepare himself/herself for the recording within the time period required for the beginning scene 110 to play out. In such manner, the video capture window 702 can operate as a type of mirror for the user to visually inspect himself/herself and the overall scene.

Figure 8:
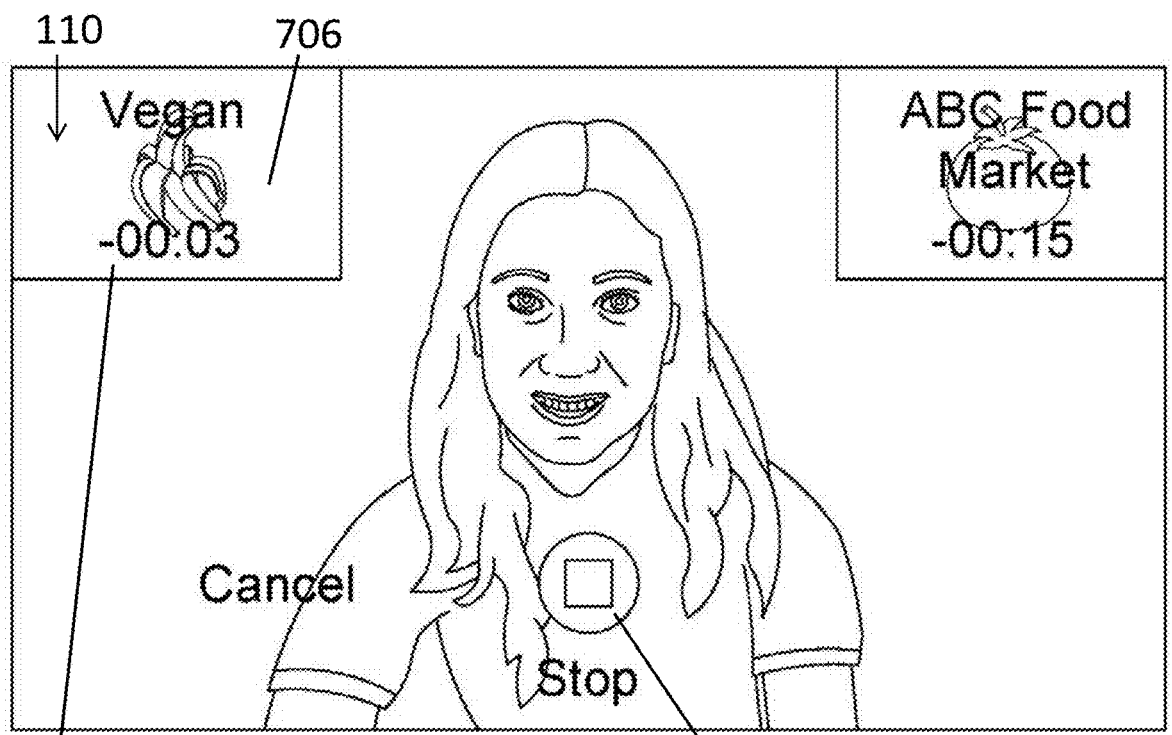
FIG. 8 is a screenshot of the exemplary software application of FIG. 1, depicting the user being queued for the recording of a middle scene with a playback of the beginning scene, in accordance with an embodiment of the present invention.
Figure 9:
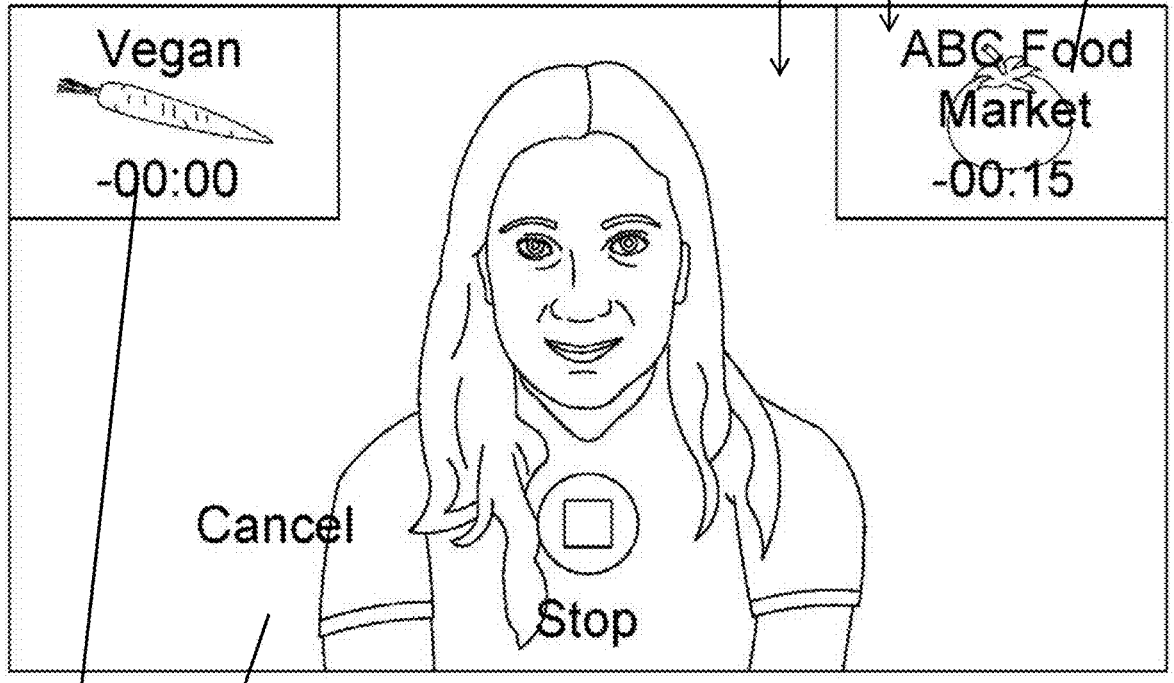
FIG. 9 is a screenshot of the exemplary software application of FIG. 1, depicting the middle scene being recorded after the playback of the beginning scene, in accordance with an embodiment of the present invention.

In one embodiment, the display 210 and the windows 706, 708, and 710 may display overlaying or superimposed indicators to assist with the inventive process. For example, a first timer 712 may overlay the beginning scene 110 within the first preview window 706. The first timer 712 may countdown to the end of the beginning scene 110 so as to indicate to the user when the automatic recording of the middle scene 702 will begin. In the exemplary embodiment, FIGS. 8 and 9 show the first timer 712' counting down as the beginning scene 110 is being played in real-time for the user's queue (FIG. 8) and shows the automatic recording occurring when the timer 712" for the beginning scene 110 reaches zero (FIG. 9). Other known timer-type indicators may also be implemented to provide the user with a real-time indication as to when the video camera 214 will start recording the middle scene 702.

Referring again to FIG. 7, in another embodiment, a second timer 714 may overlay the ending scene 112 within the second preview window 708. The second timer 714 may work similarly to the first timer 712, counting down to the end of the ending scene 112.

In yet another embodiment, a timer indicator (not shown) may overlay the scene in the video capture window 710 (instead of the preview window 706) during the playback of the beginning scene 110 to indicate to the user when the video camera 214 will automatically start recording the middle scene 702. Other known timer-type indicators may be used with the present invention but should preferably indicate to the user when the automatic recording will occur.

FIG. 8 depicts an exemplary screenshot of the beginning scene 110 being played for the user within the preview window 706 (at 3 seconds remaining in the beginning scene 110). The display 210 may also include a stop record button 800 for the user to select to stop the process. The stop record button 800 may appear automatically in response to the user pressing the record button 704. FIG. 9 depicts an exemplary screenshot of the recording of the middle scene 702 within the video capture window 710, after the beginning scene 110 has ended.

The processor 208 should be able to identify the end of the beginning scene 110 so that it can identify when to automatically begin recording the middle scene 702. In one embodiment, the video file of the beginning scene 110 may be associated with metadata that may include an indication of the length of the video file. For example, the metadata may include an indication that the video file is, for example, 15 seconds in length. Accordingly, the processor 208 knows to command the video camera 214 to begin recording automatically after 15 seconds from the start of the playback of the beginning scene 110. In another embodiment, the user may input a known length of the beginning scene 110 that the user obtained from, for example, the video provider 102. In another embodiment, the video provider 102 directly provides the time lengths for the video files that it provides. In yet other embodiments, the processor 208 may identify the end of the beginning scene 110 (and by implication the start time for the automatic recording of the middle scene 702) using other known methods and techniques.

Likewise, the processor 208 should be able to identify a stopping point for recording the middle scene 702 (and by implication when to start playing back the ending scene 112). Preferably, the processor 208 automatically stops recording the middle scene 702 immediately before playing the start of the ending scene 112. In one embodiment, the processor 208 identifies a predetermined duration/time period for the recording of the middle scene 702. Such predetermined duration may be stored in the memory 206 and may be, for example, a user input value, or a default value configured by the software application instructions. Accordingly, the processor 208 may record the middle scene 702 for the predetermined duration and may automatically, after the predetermined duration, stop recording and immediately playback the ending scene 112 within the preview window 708.

The length of the beginning scene 110 may be any length and the length of the ending scene 112 may be any length. Further, the lengths of each scene 110 and 112 may be the same, or may, in other embodiments, be different from one another.

It may be desirable, in some embodiments, for the user to be able to indicate, one-the-fly during the recording, when the user desires for the video camera 214 to stop recording the middle scene 702. This may advantageously eliminate potentially awkward silences if the user is, for example, finished speaking about the subject matter, but the video continues to record. It is known for speakers to sometimes speak more quickly under pressure than they would speak during a normal conversation. Accordingly, some embodiments of the present invention may provide for such a dynamic stop feature. In one embodiment, there may be a record stop indication in the form of an audible user command that commands the processor 208 to stop the video camera's 214 recording of the middle scene 702.

The audio input/output 212 of the user computing device 100 may include a microphone. The microphone may be utilized to receive analog input signals corresponding to ambient sounds. The real-time analog data stream may be directed to the processor 208 and converted into a digital form. The digital data may be processed by a speech recognition program that interprets the digital signals and recognizes human utterances corresponding to words in the human language. The speech recognition program may be part of the software application running on the computing device 100 to implement one or more aspects of the present invention. The microphone, the electronics (e.g., ADC) that converts the analog input signals into digital signals, and the speech recognition program that recognizes human speech words from the digital signals may be considered a speech recognition engine. A human utterance may be defined as any and all sounds originating from a human source capable of being understood as human speech. The speech recognition program may use a speech-to-text processing algorithm to convert the human utterances into a text-based format. The text may be compared to a predetermined record stop indication word or phrase. In response to the text matching the predetermined record stop indication, the processor 208 may automatically stop the video camera 214 from recording the middle scene 702 and automatically play the ending scene 112 in the preview window 708. If the text does not match the predetermined record stop indication, the video camera 214 continues to record the middle scene 702 and the speech recognition engine continues to monitor and process the analog input signals detected by the microphone.

In one embodiment, the predetermined record stop indication may be a word or phrase selected or input by the user, in, for example, a user input interface field in the software application. For example, the user may input the phrase "see you next time" as the predetermined record stop indication and may thereby stop the recording of the middle scene 702 on-the-fly by uttering the conclusory phrase "see you next time" during the recording. The user may input or select any word or groups of words that he will use to conclude the video content such as, for example, "thank you for joining us," "good-bye," etc. The user input word may be stored by the processor 208 in non-transitory memory 206 and may be associated as a record stop indication. In further embodiments, the user may selectively change the record stop indication by inputting a different word or phrase in, for example, a record stop input field on the software application.

Such embodiment of the present invention solves the problem of self-recording that exists whereby self-stopping the recording also records the arm movement towards the camera to hit the stop button. Such embodiment also solves the problem of having a static, predetermined window of time to record user content, which could result in awkward silences or require multiple retakes to get the timing right. Embodiments of the present invention provide a streamlined, flexible, and efficient system and method that improves the function of the mobile computing device 100 as a self-recording tool.

Figure 10:
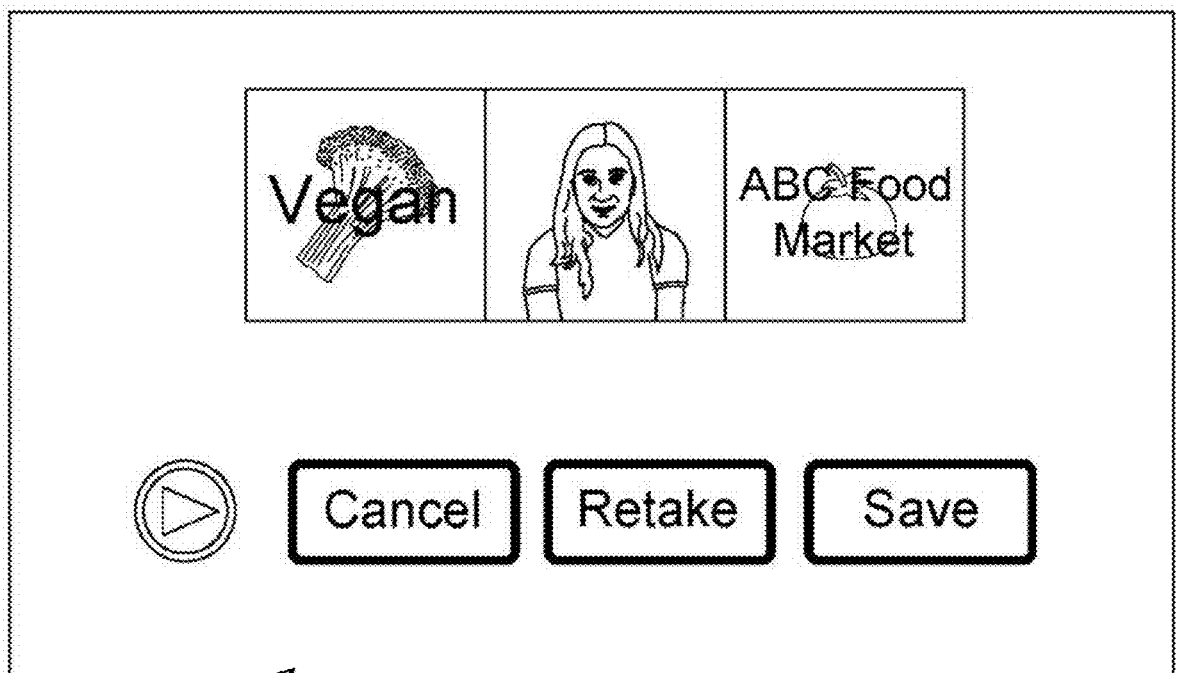
FIG. 10 is a screenshot of the exemplary software application of FIG. 1, depicting a decision screen being presented to the user whereby the user may playback the entire video or cancel, retake, or keep the video, in accordance with an embodiment of the present invention.

Referring again to the flowchart depicted in FIG. 3, in step 314, a full video is created with an introduction and a conclusory scene. Advantageously, the new full video can be created with essentially a single record button click. This step may occur after the ending scene 112 finishes its playback in the preview window 708. The full video includes the newly recorded middle scene 702 between the beginning scene 110 and the ending scene 112. Stated another way, the full video can be considered to start at the start point of the beginning scene 110, continue into the newly recorded middle scene 702, and then ends at the end of the ending scene 112. FIG. 10 depicts a confirmation screen 1000, within which the user may select to cancel the video, retake the video, save the video, and/or playback the full video.

In one embodiment, the processor 208 may be operably configured to execute instructions to equalize the video quality of each of the scenes 110, 112, and 702. In other words, the video quality of the beginning and the ending scenes 110, 112, being provided by the third-party video provider 102, may be of a different video quality than that of the middle scene 702 video recorded by the user's computing device 100. This may be undesirable. Accordingly, the software application associated with the present invention may include instructions to either automatically, or by user selection, adjust the video quality of the beginning and ending scenes 110, 112 to match the video quality of the middle scene 702. In another embodiment, the instructions may include instructions to determine the lowest video quality of the three video scenes 110, 112, 702 and adjust the quality of the remainder of the video scenes to match the lowest quality video. The software application may include a video quality conversion program operable to convert the video quality of a video file upward or downward. In yet other embodiments, there may not be a video quality conversion-equalization feature.

Publish the Full Video

Figure 11:
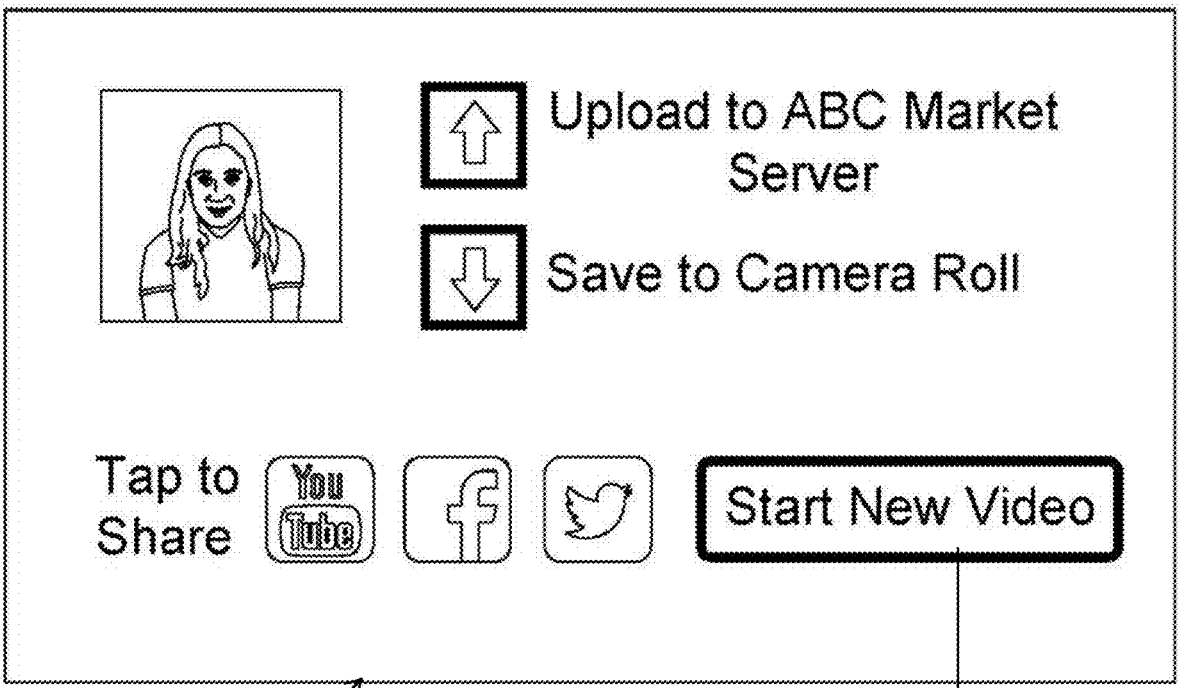
FIG. 11 is a screenshot of the exemplary software application of FIG. 1, depicting a publish screen being presented to the user whereby the user may share on social, upload to a website server, or save the video, in accordance with an embodiment of the present invention.

In step 316, the full video may be selectively published on a network, such as the Internet. FIG. 11 depicts a publication screen 1100. The publication screen 1100 may permit the user to share the full video on a social network, such as, for example, Youtube, Facebook, or Twitter. The publication screen 1100 may also permit the user to save the full video to the user computing device's 100 camera roll. In one embodiment, the publication screen 1100 may include an option for the user to selectively upload the full video to the website server 104 associated with the user's business website. In other words, there may be an option for the user to automatically publish the full video at the user's website.

In step 318, the user may decide whether to record another middle scene 702. The user may do so by, for example, pressing the "start new video" button 1102 in the publication screen 1100 (FIG. 11). Doing so may transition the user back to the home page 500 where the user may select another category or sub-category to record new user content in accordance with the present invention. The process may then proceed back to step 306 where the user can, again, record a different middle scene 702 (either under the same sub-category or a different sub-category). The process may repeat. Advantageously, the pairs of beginning and ending scenes 110 and 112 are continuously accessible to allow the user to continue to self-record new content within the video framework, without having to contact a video editing professional each time. Stated another way, the video framework can be accessed by the processor 208 at a plurality of instances to create a corresponding plurality of full videos, each of such full videos having the same beginning scene 110 and ending scene 112, but with a different recording of the middle scene 702.

Figure 12:
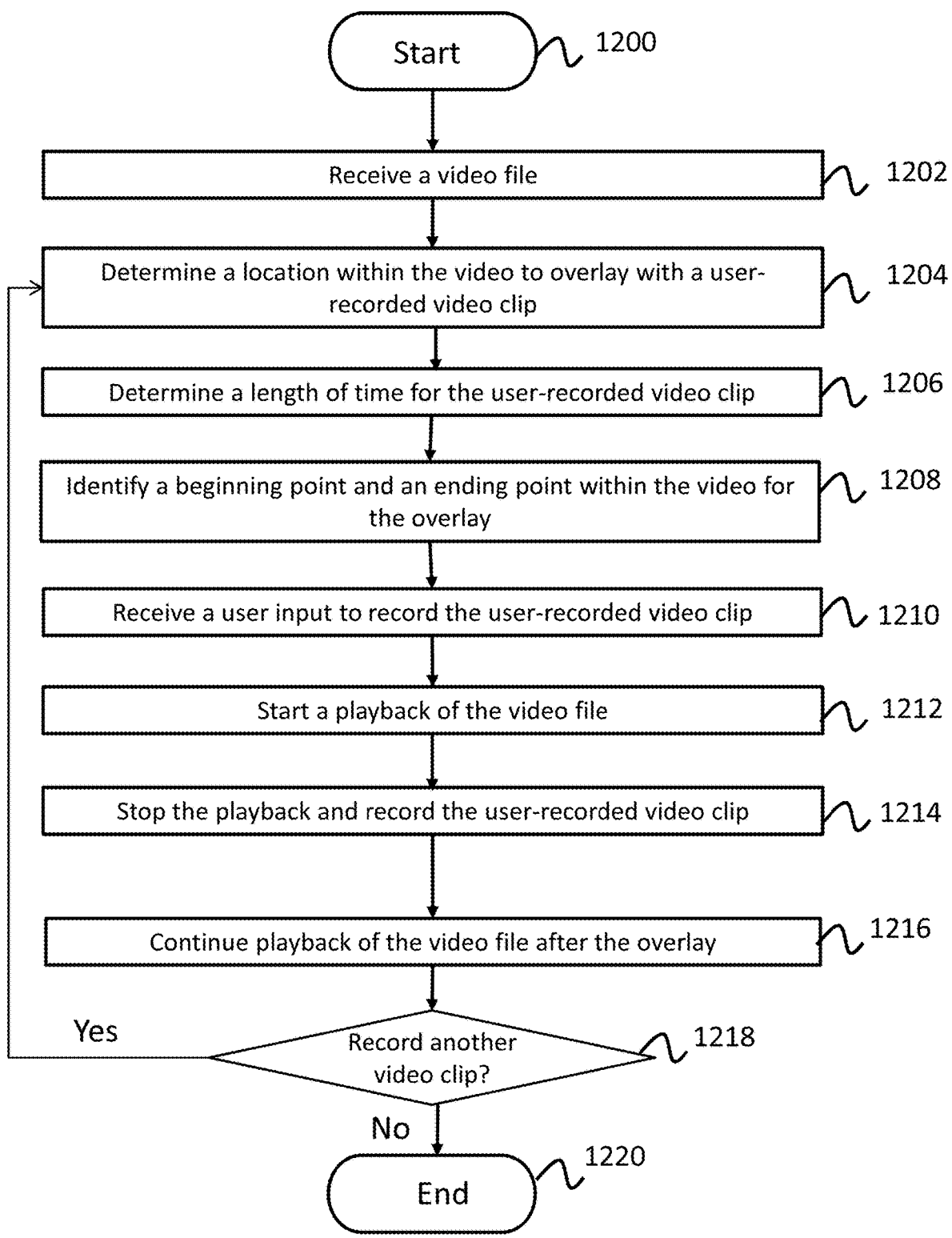
FIG. 12 is a process flow chart representing yet another exemplary method of recording a video scene within a predetermined video framework in accordance with an embodiment of the present invention.

If the answer is no and the user does not desire to record another middle scene 702, the process may end at step 320.
Another Exemplary Process Referring now primarily to the flow chart of FIG. 12, as well as, the network devices depicted in FIGS. 1-2, yet another exemplary process will be described in accordance with the present invention. Although FIG. 12 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 12 for the sake of brevity.

The process may start at step 1200 and immediately proceed to step 1202, where the computing device 100 may receive a video file. In this exemplary process, the computing device 100 may receive a single digital video file prepared by the third-party video provider 102. The digital video file should have a video length corresponding to a time period for a playback of the video file. In step 1204, a location is determined within the video length at which to overlay a portion of the video file with a user-recorded video clip. In other words, a determination is made as to where the user-recorded video clip should overlay the video. Stated yet another way, the user-recorded video clip is configured to replace a portion of the video file at a determined location. This is in contrast to the previously described exemplary process of FIG. 3, where there are two video files with a gap between the two that is configured to be filed by the user-recorded video clip. In the exemplary process corresponding to the flow chart in FIG. 12, a portion (preferably a middle portion) of the single video is replaced or overlaid with the user-recorded video clip.

In step 1206, a length of time for the user-recorded video clip is determined. In one embodiment, the length of time is a predetermined length of time. In such embodiment, the length of time may be determined by the third-party video provider, prior to the recording of the user-recorded video clip. In another embodiment, the length of time may be predetermined determined by the user, according to the techniques described herein above with reference to the flow chart of FIG. 3. In yet another embodiment, the length of time may be determined on-the-fly by the user during the recording of the user-recorded video clip by, for example, the speech recognition techniques and devices described herein above with reference to the flow chart in FIG. 3.

It should be understood that many of the techniques described herein above with reference to the flow chart in FIG. 3 may be used in the exemplary process shown in FIG. 12. Thus, for the sake of brevity, such techniques will not be repeated again in the description referencing the flow chart of FIG. 3.

In step 1208, a beginning point and an ending point within the video length may be identified for the overlay of the user-recorded video clip. The beginning point and the ending point may be determined based on the location determined for the overlay and/or the length of time for the user-recorded video clip. For example, if the video file has a length of 3 minutes and the location for the overlay is identified at the 1 minute mark, the beginning point may be the 1 minute mark and the ending point may be a point after the 1 minute mark corresponding to the length of time of the user-recorded video clip. If, for example, the length of time is 30 seconds, the ending point for the overlay would be at the 1 minute and 30 second mark of the video file. Accordingly, the produced video would overlay the 30 second user-recorded video clip over the original video file; in other words, replacing 30 seconds of the original video file with the 30 second user-recorded video clip.

In step 1210, a user input to record the user-recorded video clip is received by, for example, the processor 208, via the user input interface 202 (e.g., touchscreen). In step 1212, the processor 208 may cause, in response to the user input to record, a playback of the video file on the video display 210 (similar to the playback described above with reference to the flow chart in FIG. 3). In step 1214, the processor 208 may automatically stop the playback of the video file at the identified beginning point and may automatically record the user-recorded video clip (similar to step 310 in the flow chart in FIG. 3). In step 1216, the processor 208 may automatically stop recording the user-recorded video clip at the ending point and may automatically continue the playback of the video file. Preferably, the continuation of the playback would begin (not where the playback left off before recording, but at the point in the video file corresponding to the ending point of the user-recorded video clip). In other words, the user-recorded video clip may replace an equivalent portion of the original video file so that the continuation of the playback in step 1216 reflects that. In step 1218, the user may decide whether to record another video clip. If the answer is yes, the process may proceed to step 1204 and the process may repeat. If the answer is no, the process ends at step 1220.

A novel and efficient system and method for recording video content within a predetermined video framework has been disclosed. Embodiments of the invention provide a real-time queue for the recording, including, in sequential order and in response to a user input to record: playing a beginning scene within a preview window, automatically recording a middle scene while simultaneously displaying the middle scene within a video capture window, and playing an ending scene within a preview window. In addition, embodiments of the invention provide for receiving a first and a second predetermined digital video file prepared by a remote third-party video provider and recognizing each as a beginning scene and an ending scene. Advantageously, the user can continuously record new video content on a rather frequent basis between a re-usable, predetermined video framework.

What is claimed is:

1. A method comprising steps of:
receiving, at a processor over a network, at least a first digital video file, the processor being communicatively coupled to a video display and a front-facing camera;
recognizing, by the processor, a beginning scene and an ending scene within the at least a first digital video file;
displaying a video record screen including a first preview window and a second preview window, and displaying a live view of the front-facing camera;
after, and in response to, receiving at least the first digital video file and while displaying the video record screen, receiving, by the processor, a user input to record a middle scene, wherein the beginning scene, the middle scene, and the ending scene are configured to form a full video; and
responsive to receiving the user input to record the middle scene, the processor:
1) first, playing the beginning scene within the first preview window of the video record screen on the video display;
2) second, after and in response to playing the beginning scene, automatically, after playing the beginning scene, recording the middle scene via the front-facing camera; and
3) third, after recording the middle scene, automatically playing the ending scene within the second preview window of the video record screen on the video display.

2. The method in accordance with claim 1, wherein:
the front-facing camera has a lens facing a user on a same side as the video display.

3. The method in accordance with claim 1, wherein:
the step of playing the beginning scene further includes displaying a timer configured to indicate a start time of the automatic recording of the middle scene.

4. The method in accordance with claim 1, further comprising a step of:
identifying, by the processor, the end of the beginning scene and a start of the ending scene; and
wherein the step of recording the middle scene further includes automatically stopping, by the processor, recording the middle scene immediately before playing the start of the ending scene.

5. The method in accordance with claim 1, wherein:
the full video starts at the start of the beginning scene and ends at the end of the ending scene.

6. The method in accordance with claim 1, wherein:
the beginning scene and the ending scene are user-customized scenes created by a remote third-party video provider and transmitted by the remote third-party video provider to the processor over a network; and
the processor is housed within a personal mobile device of a user for self-recording the middle scene between a preview of the beginning scene and a preview of the ending scene.

7. The method in accordance with claim 1, wherein:
the at least a first digital video file includes a second digital video file that comprises the ending scene.

8. The method in accordance with claim 1, further comprising a step of:
identifying, by the processor, a predetermined duration for recording the middle scene; and
wherein the automatic recording of the middle scene is performed by the processor for the predetermined duration.

9. The method in accordance with claim 1, wherein the processor is communicatively coupled to a microphone and is operably configured to execute instructions for:
  receiving, via a user input interface, at least one word from the user;
  associating the at least one word with a record stop indication; and
  during the recording of the middle scene:
    recognizing a human utterance received via the microphone;
    analyzing the human utterance to identify at least one human language word;
    comparing the at least one human language word identified from the human utterance to the at least one word associated with the record stop indication; and
    in response to determining that the at least one human language word matches the at least one word associated with the record stop indication, stopping the recording of the middle scene and automatically playing the ending scene.

10. The method in accordance with claim 1, further comprising steps of:
  receiving, by the processor, a user input to publish the full video; and
  responsive to receiving the user input, automatically publishing, by the processor, the full video on the Internet.

11. A method comprising steps of:
  receiving, at a processor over a network from a computer, at least one digital video file including a beginning scene and an ending scene, the processor being communicatively coupled to a video display and a video camera;
  recognizing, by the processor, within the at least one digital video file the beginning scene and the ending scene;
  displaying a video record screen on the video display including a first preview window, a second preview window, and a record button, the video record screen further showing a live view of the video camera;
  after, and in response to, receiving the at least one digital video file, receiving, by the processor, a user input to record a middle scene, wherein the beginning scene, the middle scene, and the ending scene being configured to form a full video; and
  responsive to receiving the user input to record, providing a real-time queue for the recording by sequentially, in real-time:
    1) first, playing the beginning scene within the first preview window of the video record screen on the video display;
    2) second, automatically recording the middle scene via the video camera after playing the beginning scene while simultaneously displaying the middle scene within the video record screen on the video display; and
    3) third, automatically playing the ending scene within the second preview window on the video display after and in response to recording the middle scene.

12. The method in accordance with claim 11, wherein: during the real-time queue, the video capture window, the first preview window, and the second preview window are simultaneously visible on the video display.

13. The method in accordance with claim 11, wherein:
  the processor is communicatively coupled to a front-facing camera, the front-facing camera having a lens facing a user on a same side as the video display; and
  the recording of the middle scene is by the front-facing camera.

14. The method in accordance with claim 11, wherein:
  the beginning scene and the ending scene are user-customized scenes created by a remote third-party video provider and transmitted by the remote third-party video provider to the processor over a network; and
  the processor is housed within a personal mobile device of a user for self-recording the middle scene and self-creating the full video.

15. The method in accordance with claim 11, wherein:
  the beginning scene and the ending scene are stored in a non-transitory memory accessible by the processor, the processor being operably configured to execute instructions for:
    accessing the beginning scene and the ending scene at a plurality of instances to create a corresponding plurality of full videos, each of the plurality of full videos having the same beginning and ending scene, but with a different recording of the middle scene.

16. The method in accordance with claim 11, wherein the processor is communicatively coupled to a microphone and is operably configured to execute instructions for:
  receiving, via a user input interface, at least one word from the user;
  associating the at least one word with a record stop indication; and
  during the recording of the middle scene:
    recognizing a human utterance received via the microphone;
    analyzing the human utterance to identify at least one human language word;
    comparing the at least one human language word identified from the human utterance to the at least one word associated with the record stop indication; and
    in response to determining that the at least one human language word matches the at least one word associated with the record stop indication, stopping the recording of the middle scene and, after stopping, automatically playing the ending scene.

17. A method comprising steps of:
  receiving, by a processor, a digital video file prepared by a third-party video provider, the digital video file having a video length;
  determining a location within the video length at which to overlay a portion of the video file with a user-recorded video clip;
  identifying a beginning point and an ending point within the video length for the overlay of the user-recorded video clip based on the location;
  displaying a video record screen including a first preview window and a second preview window, wherein a live view of a video camera is displayed in the video record screen with the first and second preview windows;
  receiving a user input to record the user-recorded video clip while displaying the video record screen; and
  in response to the user input to record, the processor automatically and sequentially in real-time:
    starting a playback of the video file in the first preview window;

stopping the playback of the video file at the beginning point and automatically recording the user-recorded video clip via the video camera; and stopping recording the user-recorded video clip at the ending point and continuing the playback of the video file in the second preview window.

18. The method in accordance with claim 17, further comprising a step of:

determining a length of time for the user-recorded video clip; and wherein the identifying step further includes identifying the beginning point and the ending point within the video length for the overlay of the user-recorded video clip based on the length of time.

19. The method in accordance with claim 18, wherein:

the step of determining the length of time for the user-recorded video clip is performed prior to recording the user-recorded video clip by the third-party video provider.

20. The method in accordance with claim 17, wherein:

the step of determining the length of time for the user-recorded video clip is performed prior to recording the user-recorded video clip by a user.

\* \* \* \* \*